United States Patent
Knowles

(10) Patent No.: US 8,966,223 B2
(45) Date of Patent: Feb. 24, 2015

(54) APPARATUS AND METHOD FOR CONFIGURABLE PROCESSING

(75) Inventor: Simon Knowles, Bath (GB)

(73) Assignee: Icera, Inc., Bristol (GB)

( * ) Notice: Subject to any disclaimer, the term of this patent is extended or adjusted under 35 U.S.C. 154(b) by 1173 days.

(21) Appl. No.: 11/122,385

(22) Filed: May 5, 2005

(65) Prior Publication Data

US 2006/0253689 A1    Nov. 9, 2006

(51) Int. Cl.
*G06F 15/80* (2006.01)
*G06F 15/78* (2006.01)
*G06F 9/30* (2006.01)
*G06F 9/38* (2006.01)

(52) U.S. Cl.
CPC ........ *G06F 15/7867* (2013.01); *G06F 9/30036* (2013.01); *G06F 9/3004* (2013.01); *G06F 9/30145* (2013.01); *G06F 9/30181* (2013.01); *G06F 9/3885* (2013.01); *G06F 9/3897* (2013.01)
USPC ............................................. 712/15; 712/229

(58) Field of Classification Search
CPC .................................. G06F 15/00; G06F 9/30
USPC ........ 712/11, 16, 18, 15, 229, 39, 43; 326/41; 370/229, 391; 703/23
See application file for complete search history.

(56) References Cited

U.S. PATENT DOCUMENTS

| | | | | |
|---|---|---|---|---|
| 5,600,845 A * | 2/1997 | Gilson | ............................ | 712/39 |
| 5,784,636 A * | 7/1998 | Rupp | ............................ | 712/37 |
| 6,023,564 A * | 2/2000 | Trimberger | ...................... | 703/23 |
| 6,023,742 A * | 2/2000 | Ebeling et al. | ................. | 710/107 |
| 6,052,773 A * | 4/2000 | DeHon et al. | ................... | 712/43 |
| 6,092,174 A * | 7/2000 | Roussakov | ....................... | 712/15 |
| 6,105,105 A * | 8/2000 | Trimberger | ................... | 711/103 |
| 6,226,735 B1 * | 5/2001 | Mirsky | ............................ | 712/18 |
| 6,255,849 B1 * | 7/2001 | Mohan | ........................... | 326/41 |
| 6,339,819 B1 * | 1/2002 | Huppenthal et al. | ............ | 712/16 |
| 6,959,378 B2 * | 10/2005 | Nickolls et al. | ............... | 712/229 |
| 6,961,084 B1 * | 11/2005 | Duncan et al. | ............. | 348/222.1 |
| 7,149,996 B1 * | 12/2006 | Lysaght et al. | .................. | 716/16 |
| 7,493,472 B2 * | 2/2009 | Baxter | ............................ | 712/43 |
| 2004/0019765 A1 * | 1/2004 | Klein, Jr. | ........................ | 712/15 |

(Continued)

FOREIGN PATENT DOCUMENTS

| JP | 7-503804 A | 4/1995 |
|---|---|---|
| JP | 11008547 A | 12/1999 |
| WO | WO 2004/010286 | 1/2004 |

OTHER PUBLICATIONS

Francisco et al., Reconfigurable Instruction Set Processors from a Hardware/Software Perspective, 2002, IEEE Transactions on Software Engineering, vol. 28, pp. 847-862.*

(Continued)

*Primary Examiner* — Titus Wong

(57) ABSTRACT

A configurable execution unit comprises operators capable of being dynamically configured by an instruction at the level of processing multi-bit operand values. The unit comprises one or more dynamically configurable operator modules, each module being connectable to receive input operands indicated in an instruction, and a programmable lookup table connectable to receive dynamic configuration information determined from an opcode portion of the instruction and capable of generating operator configuration settings defining an aspect of the function or behavior of a configurable operator module, responsive to said dynamic configuration information in the instruction.

25 Claims, 3 Drawing Sheets

(56) References Cited

U.S. PATENT DOCUMENTS

| | | | |
|---|---|---|---|
| 2006/0075211 A1* | 4/2006 | Vorbach | 712/221 |
| 2007/0050603 A1* | 3/2007 | Vorbach et al. | 712/221 |
| 2007/0067380 A2* | 3/2007 | Bishop et al. | 708/501 |

OTHER PUBLICATIONS

Reconfigurable Instruction Set Processors: An Implementation Platform for Interactive Multimedia Applications; p. 481-485; 2001 IEEE.

Notice of Reasons for Rejection; 5 pages; Nov. 30, 2010.

Barat F. et al. Reconfigurable Instruction Set Processors: A Survey. In Proceedings of the 11th International Workshop on Rapid System Prototyping. RSP 2000. Shortening the Path from Specification to Prototype (Cat. No. PR00668) IEEE Comput. Soc. Los Alamitos, CA, USA, 2000, pp. 168-173. ISBN 0-7695-0668-2.

Barat F. et al. Reconfigurable instruction set processors: an implementation platform for interactive multimedia applications. Institute of Electrical and Electronics Engineers, Conference Record of the 35th. Asilomar Confererence on Signals, Systems & Computers, Pacific Grove, CA Nov. 4-7, 2001.

Barat F. et al. Software pipelining for coarse-grained reconfigurable instruction set processors. Design Automation Conference, 2002. Proceedings of ASP-DAC 2002. 7th Asia and South Pacific and the 15th International Conference on VLSI Design. Proceedings. Bangalore, India Jan. 7-11, 2002, Los Alamitos, CA USA, IEEE Comput. Soc, US, pp. 338-344.

Barat F. et al. Reconfiguration Instruction Set Processors from a Hardware/Software Perspective. In IEEE Transactions on Software Engineering. IEEE USA, vol. 28, No. 9, Sep. 2002, pp. 847-862. ISSN 0098-5589.

Barat F. et al. Low power coarse-grained reconfigurable instruction set processor. Field programmable logic and applications. 13th International Conference, FPL 2003. Proceedings (Lecture notes in computer science vol. 2778) Springer-Verlag Berlin, Germany 2003, pp. 230-239.

Baumgarte V et al. PACT XPP—A self-reconfigurable data processing architecture. Journal of Supercomputing, Lluwer, Dordrecht, NL. vol. 26 2003, pp. 167-184.

Busa N.G. et al. A run-time word-level reconfigurable coarse-grain functional unit for a VLIW processor. 15th International Symposium on System Synthesis. ISSS. Kyoto, Japan, Oct. 2-4, 2002, pp. 44-49.

International Search Report. PCT/GB2006/001629. Completion of Search Jul. 25, 2006. Date of mailing. Aug. 16, 2008.

Katstrup B. et al.; ConCISE: a compiler-driven CPLD-based instruction set accelerator. Field-Programmable Custom Computing Machines, 1999. Proceedings. Seventh Annual IEEE Symposium on Napa Valley, CA USA Apr. 21-23, 1999. Los Alamitos, CA USA, IEEEE Comput. Soc. U.S. Apr. 21, 1999, pp. 92-101.

Kievits, P. et al.; Real DSP technology for telecom baseband processing. 9th International Conference on Signal Processing Applications & Technology, 1998.

Op De Beeck P et al.; Crisp: a template for reconfigurable instruction set processors. Field programmable logic and applications. 11th International Conference, FPL 2001. Proceedings (Lecture notes in computer science vol. 2147) Springer-Verlag Berlin, Germany 2001, pp. 296-305.

Sawitzki S. et al.; Increasing microprocessor performance with tightly-coupled reconfigurable logic arrays. Field-Programmable Logic and Application. From FPGAS to Computing Paradigm. 8th International Workshop. FPL '98. Proceedings Springer-Verlag Berlin, Germany, 1998, pp. 411-415.

* cited by examiner

APPARATUS AND METHOD FOR CONFIGURABLE PROCESSING

BACKGROUND OF THE INVENTION

1. Field of Invention

This invention relates to computer processors having configurable execution units, methods for operating such computer processors and execution units, and computer program products that make use of instruction sets for computers.

2. Description of Related Art

Some computer processors are limited, by virtue of having an instruction set fixed at the time of manufacture, in their ability to efficiently handle different types of data processing calculations within certain algorithms and in their ability to perform different algorithms selected for example from convolution, Fast Fourier Transform, Trellis/Viterbi calculations, correlation, finite impulse response filtering, and the like. In particular, known computer processors do not support the performance of software-customised instructions which operate on multi-bit operand values, for example such instructions acting on operands of four or more bits or at the level of computer words (typically 16, 32, or 64 bits). Known computer processors cannot efficiently perform complex software-customised operations involving sequences of simpler customized operations, in response to individual software-customized processor instructions forming part of the processor instruction set.

Embodiments of the present invention seek to provide improved computer processors and methods of operating computer processors, and the like.

SUMMARY OF INVENTION

According to an aspect of the present invention there is provided a configurable execution unit comprising operators capable of being dynamically configured at the level of processing multi-bit operand values by an instruction. The configurable execution unit comprises one or more dynamically configurable operator modules, the or each module being connectable to receive input operands indicated in an instruction, and a programmable lookup table connectable to receive dynamic configuration information determined from an opcode portion of an instruction and capable of generating operator configuration settings defining an aspect of the function and/or behaviour of said configurable operator module, responsive to said dynamic configuration information in the instruction.

In preferred embodiments, the programmable lookup table comprises a programmable logic array. Still more preferably, the programmable lookup table comprises cascaded programmable logic arrays.

In the disclosed embodiment, the configurable execution unit comprises a configurable switching fabric having connectivity defined at least in part by pseudo static control information. Moreover, the configurable switching fabric may comprise one or more of a configurable input interconnect means connected upstream of the configurable operators and a configurable output interconnect means connected downstream of the configurable operators. The preferred embodiment has both.

Where configurable input interconnect means are provided, one or more configurable operator module outputs may be connected to said configurable input interconnect means.

Preferably, at least one configurable operator module is hard-wired to support a predetermined class of operation and is dynamically configurable by operator configuration settings to adjust operator function and/or behaviour within said general operation class. Various operator functions may be provided, depending on the intended application. Preferred embodiments tend to include a module with configurable shift and or permute functionality. Still more preferably, certain embodiments include storage operators capable of holding intermediate results.

Typically, one or more of the configurable components comprises pseudo static control information provided independently of the instruction carrying the dynamic configuration information. Such pseudo static control information may be established for example by configuration setting instructions or by direct data transfer to the component concerned.

In most embodiments, one or more dynamically configurable operators is configurable by means of configuration information provided in a data processing instruction. However the principles disclosed herein may also apply to other types of instructions.

Preferred configurable execution units comprise a plurality of dynamically configurable operators configurable by means of configuration information provided in a data processing instruction, wherein, in use, an operator configuration according to said configuration information acts on operands indicated in said data processing operation.

In other embodiments, or in addition, one or more dynamically configurable operators is configurable by means of configuration information provided in a data processing instruction, wherein, in use, an operator configuration according to said configuration information acts on operands indicated in a subsequent instruction.

Preferred execution units are arranged so as to be capable, in response to a single instruction, of performing two or more sequential, selectively configurable operations on an operand before outputting results to a store (e.g. a register file) outside the configurable execution path or unit. In preferred configurable execution units one or more of said configurable operator modules supports SIMD operations.

Typically, operators in one or more of the following operator classes are provided: multiplier, arithmetic logic, storage, shift and/or permute. However any number or type of operators may be used.

In embodiments according to the present invention, the term "programmable lookup table" should be construed widely to include any device capable of supplying operator configuration settings selected for example from one or more of: a carry-in signal; a multiplexer selection; a negotiable input; an overflow setting; and other suitable inputs of operators, responsive to information in an instruction.

Furthermore the programmable lookup table may usefully receive one or more inputs from the dynamically configurable operator module(s). In this way outputs from the operators can at least partly define configuration inputs to the operators, for use in subsequent cycles.

Typically, although not exclusively, inputs from the dynamically configurable operator module to the programmable lookup table are selected from one or more of: an overflow indication; a FIFO full signal; a Boolean result of arithmetic comparison; and other suitable outputs of operators.

In certain embodiments the programmable lookup table may be regarded as comprising pseudo static control information which is settable in advance and selectable by configuration information carried in an instruction.

According to another aspect of the invention there is provided a method of operating a configurable execution unit comprising operators capable of being dynamically configured at the level of processing multi-bit operand values by an instruction, comprising:

decoding an instruction comprising configuration information in an opcode;

translating the configuration information into operator configuration settings for at least one configurable operator according to a programmable lookup table;

supplying said operator configuration settings to said at least one configurable operator such that an aspect of the function and/or behaviour of said operator is thereby selectively adjustable on an instruction by instruction basis.

Preferred methods permit sequences of two or more operations to be performed in series responsive to a single instruction. Alternatively, or more likely in addition, two or more operations may be performed in parallel responsive to the instruction.

Preferred embodiments facilitate combinations of series and parallel operations to be performed responsive to a single instruction. In this way, software-customized instructions can cause operands to flow through networks of linked operators performing overall relatively complex calculations as sets of interrelated operations, responsive to a single instruction.

Further, where a plurality of series and/or parallel operations is performed responsive to the instruction, intermediate results may be held in a storage operator between operations or before being output from the configurable execution unit to a result store.

Moreover, were pluralities of series and/or parallel operations are performed responsive to the instruction, intermediate results may be shifted or permuted between operations or before being output from the configurable execution unit to a result store.

According to another aspect of the present invention there is provided a computer program product comprising program code means for performing any of the aforementioned methods.

According to another aspect of the present invention there is provided an instruction comprising an opcode portion defining a data processing operation of a type including dynamic configuration information for setting a configuration of one or more operators of a configurable execution unit, a configuration information field containing operator configuration information, and at least one field indicating an operand for use in the data processing operation.

According to another aspect of the present invention there is provided a computer processing comprising a configurable execution unit, optionally in combination with a fixed execution unit. Preferable one of more of the execution units are capable of SIMD processing.

Additional advantages and novel features of the invention will be set forth in part in the description which follows and in part will become apparent to those skilled in the art upon examination of the following disclosure or may be learned by practice of the invention.

BRIEF DESCRIPTION OF DRAWINGS

For a better understanding of the present invention, and to show how the same may be carried into effect, reference will now be made, by way of example only, to the accompanying drawings in which.

DETAILED DESCRIPTION OF ILLUSTRATIVE EMBODIMENTS

Figure 1:
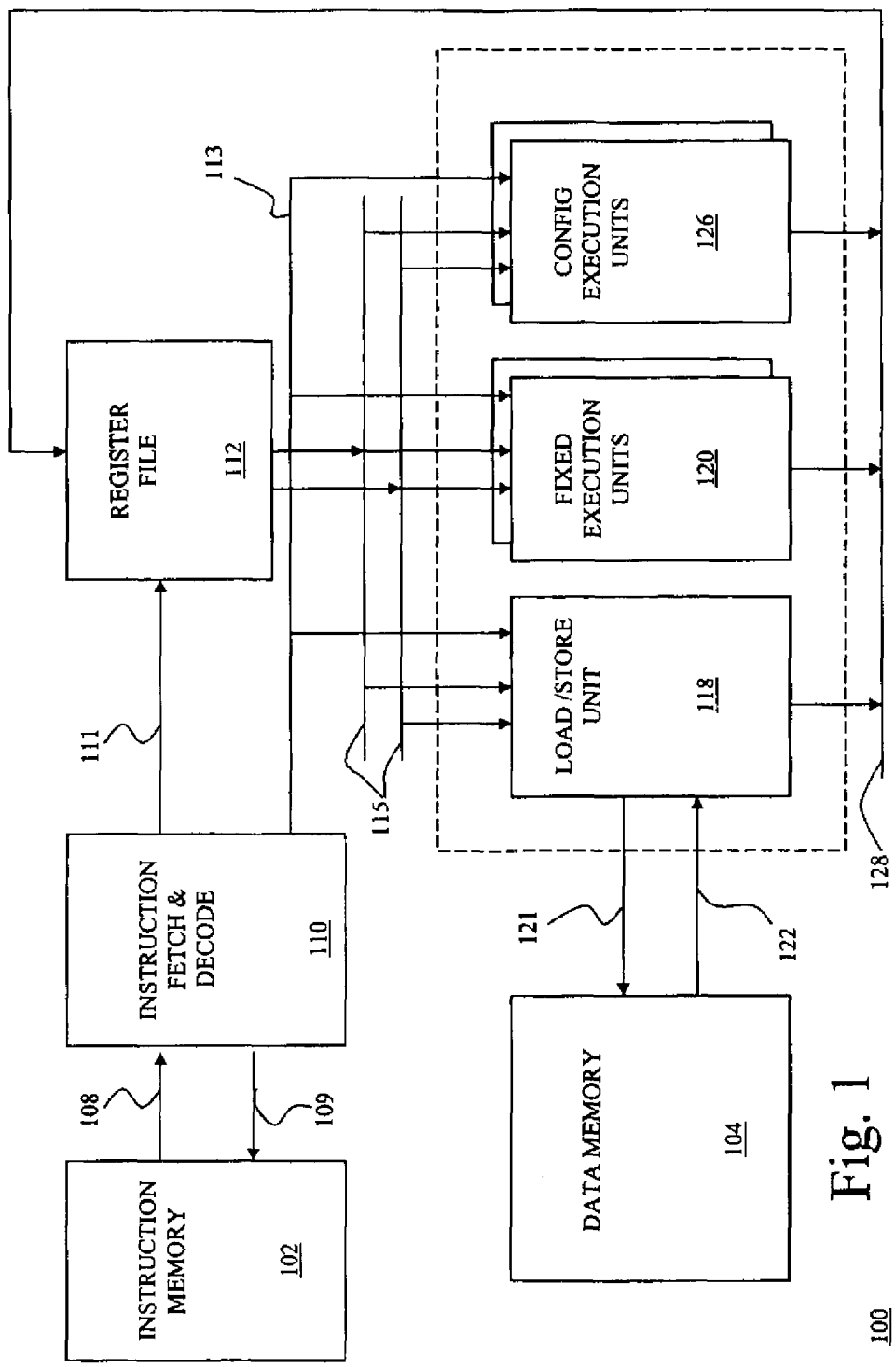
FIG. 1 Is a block diagram of a computer processor embodying the present invention.

The processor 100 of FIG. 1 might be part of a computer system in which it is coupled to a main memory and peripherals by a communications bus. Such processor systems may support a range of peripherals in a wide variety of devices and applications, as will be appreciated by a skilled person.

The processor 100 has an instruction memory 102, a data memory 104, an instruction fetch and decode circuit 110, a register file 112, a load/store unit 118, a predetermined number of fixed execution units 120, and a predetermined number of configurable execution units 126.

The instruction memory 102 is coupled to the instruction fetch and decode circuit 110 by means of an instruction bus 108 and an address bus 109. The instruction fetch and decode circuit 110 is further connected to the register file 112 by an address bus 111, and to load/store unit 118, fixed execution units 120 and the configurable execution units 126 by control bus system 113. The control bus 113 is used for example to carry operation configuration information decoded from instructions to the relevant inputs of the load/store unit 118, the fixed execution units 120 and the configurable execution units 126. An operand bus system 115 supplies the load/store unit 118, fixed execution units 120 and the configurable execution units 126 with operands from the register file based on the decoded instruction.

The load/store unit 118 has connections to and from 121, 122 the data memory 104 and can output results to a result bus 128 also serving to receive outputs of the fixed execution units 120 and the configurable execution units 126. The result bus 128 is fed back to an input of the register file 112.

In this embodiment, the processor 100 supports single instruction multiple data (SIMD) processing in the fixed and configurable execution units. In other embodiments it is possible that only one or neither of the fixed and configurable execution units support SIMD processes.

Control circuitry in the instruction fetch and decode circuit 110 is generally responsible for requesting, receiving and decoding a sequence of instructions from the instruction memory 102 and controlling the various components of the processor in accordance with the those instructions. Typical instructions include load/store operations, control function operations, data processing operations and/or specific operations performed by various functional units.

Load/store instructions are used to access data in the data memory 104 and to move the data between the data memory 104 and the register file 112, where the data resides immediately prior to, and immediately after, operations performed on it. Control function operations such as branches may operate entirely within the instruction decode and fetch unit 110, for example to affect the sequence of fetched instructions, or may involve one or more of the fixed and configurable execution units in the calculation of settings for the processor. Data processing operations are used in the performance of algorithms and, likewise, may involve fixed and/or configurable execution units, as will be explained in more detail hereinafter.

Figure 2:
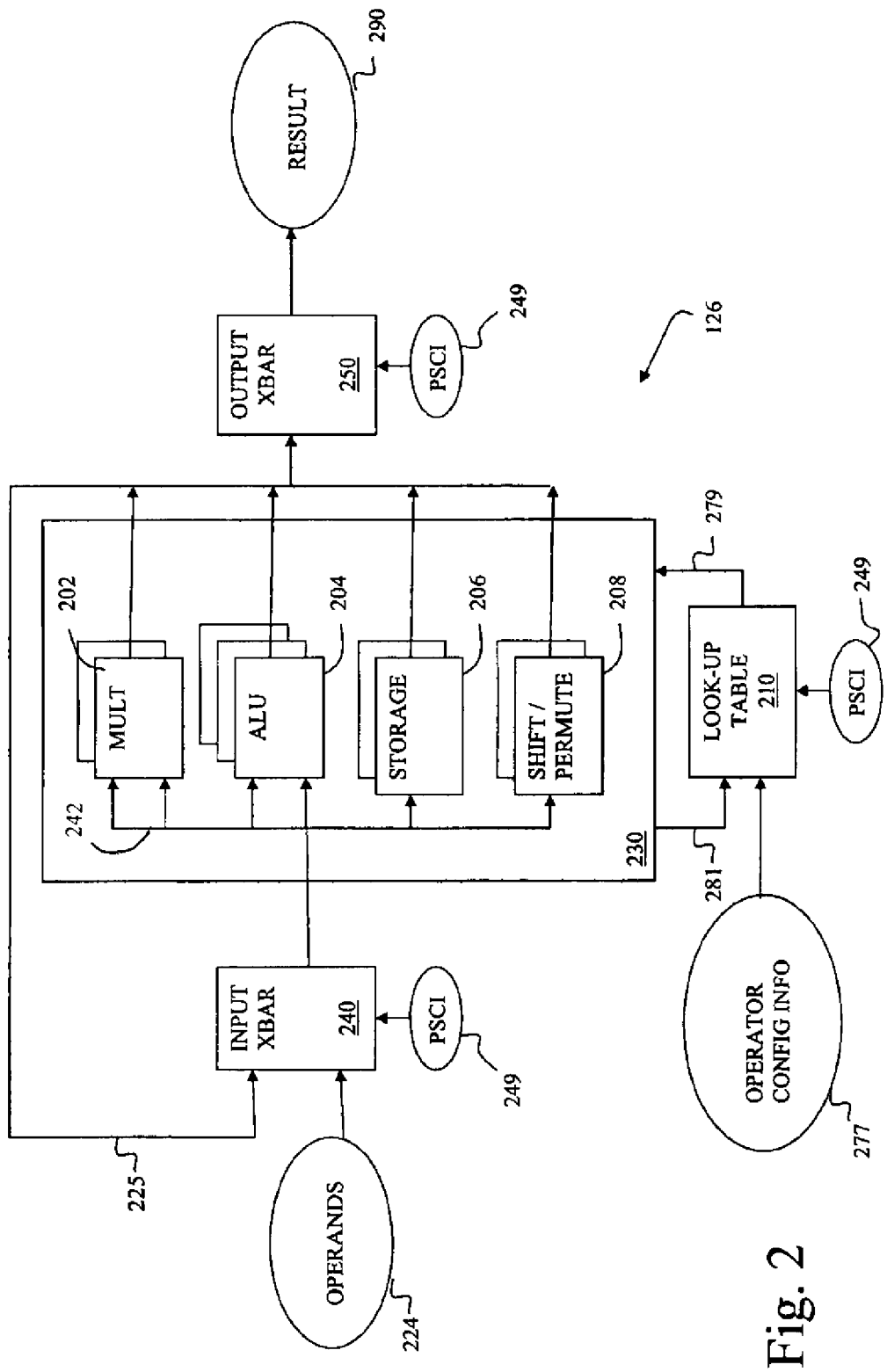
FIG. 2 Is a block diagram schematically showing an exemplary configurable execution unit of the computer processor of FIG. 1.

FIG. 2 is a schematic illustration of the internal components of an exemplary execution unit 126. With reference to FIG. 2, the configurable execution unit 126 includes a programmable lookup table 210, a configurable operator stage 230, an input crossbar interconnect 240, and an output crossbar interconnect 250.

The programmable lookup table 210 and the interconnects 240,250 are configurable in the sense they rely on pseudo-static control information which is presetable by special-purpose instructions, but which is not itself dynamically configurable on a cycle-by-cycle basis by data processing instructions. This presetable control information is referred to herein as pseudo static control information (PSCI) and is indicated by the reference numerals 249 on FIG. 2. The pseudo static control information 249 dictates aspects of the functionality and behaviour of the programmable lookup table 210 and the cross bar interconnects 240, 250 in a manner that will be apparent to a skilled person.

The configurable operator stage 230 includes sets of operator modules 202-208, each designed to perform a different class of operations. The operator modules are supplied by operand input buses 242 from the input crossbar interconnect. In this exemplary embodiment there are provided multiply operators 202, ALU operators 204, storage operators 206 and shift/permute operators 208. A skilled person will appreciate that the number and functions of operators will be based on the intended application and/or the intended purpose of the processor. It is possible that all or a selection of the operator modules 202-208 are dynamically configurable by means described herein.

The operator modules 202-208 are hard-wired to an extent making them efficient in the operations they are designed to perform but at the same time have various control inputs permitting configurability at the level of behaviour effecting performance of operations on multi-bit values. This is to support variations in behaviour and or type of the operator modules within the class of operations each is designed to perform. For example an addition unit may support subtraction as well as addition (different types of operation or function within a general class of arithmetic), it may support a variety of SIMD vector data types as well as scalar types (versatile behaviour), and it may support a variety of rounding modes and/or overflow behaviours (selectable behaviour).

In the preferred embodiment, control inputs to the operators 202-208 and interconnections of various elements on the operator stage 230 are configurable to an extent permitting efficient performance of the desired variety of algorithms, particularly vector algorithms, examples of which include convolutions, Fast Fourier Transforms, Trellis/Viterbi calculations, correlations, finite impulse response filtering, and others. This extent is in practice readily established by appropriately skilled engineers, who also know the range of data processing functionalities required for an instruction set to support relevant calculations according to such algorithms as well as the control functions of a processor.

The operators of the operator stage 230 are dynamically configurable, on an instruction by instruction basis ("dynamically"), such that an instruction containing configuration information (e.g. a data processing instruction) can selectively alter operator function (operation type) and/or behaviour by supplying the configuration information as control settings to be applied when its operands are operated on. Alternatively, the instruction set may be designed so that configuration information in an instruction configures operator function and/or behaviour to be applied when processing operands from a subsequent instruction (e.g. a subsequent data processing operation).

Control inputs 279 for the operators derived from the programmable lookup table 210 are supplied to the operator stage, for example to provide control inputs to control the function and/or behaviour of the operators 204-208. Examples of these control inputs include carry-in signals, multiplexer selections, negotiable inputs, and overflow behaviour control settings. Control outputs 281 from operator modules 202-208 in the operator stage 230 can be output to the programmable lookup table 210, and therefore may, in turn, participate in defining control input settings 279. Examples of control outputs 281 include overflow indications, FIFO full signals, and the Boolean results of arithmetic comparisons.

In practice, operation configuration information 277 in say a data processing instruction is decoded and supplied to the programmable lookup table 210. This configuration information 277, together with control information 281, is translated by the programmable look-up table 210 into corresponding control inputs 279 for the operator stage and supplied to the operator stage 230. The translation function performed by the lookup table 210 is determined by pseudo static control information 249, which in turn may be set by earlier control instructions.

In the preferred embodiment, the programmable look up table 210 may be regarded itself as depending on pseudo static control information selectable based on operator configuration information in a data processing instruction. The programmable lookup table 210 is thus able to produce inputs to the operators responsive to dynamic configuration information 277 (derived from an instruction), or control outputs from the operators 281, or PSCI 249, or any combination of these inputs to the programmable look up table 210. There is thus no need for pseudo static control information to be input directly to the operator stage 230. Although this may be desirable in some circumstances.

Figure 2B:
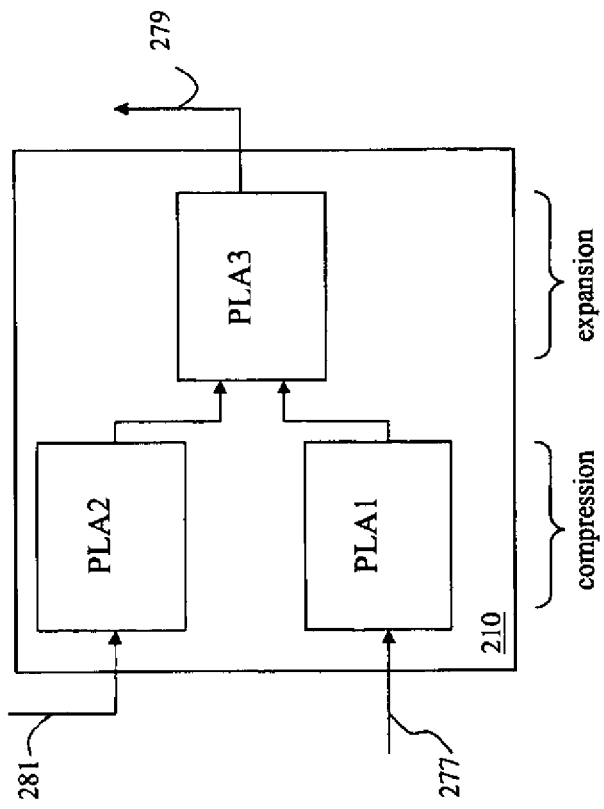
Figure 2A:
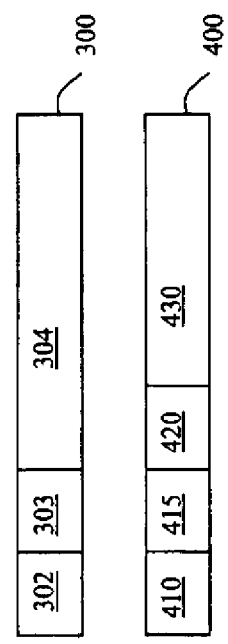

With reference to FIG. 2A, the programmable lookup table 210 can be implemented as a programmable logic array (PLA) of a type well-known to a skilled person, or as a cascade of such PLAs, as illustrated in FIG. 2B. In the case of FIG. 2B, PLA1 translates configuration bits 277 from the instruction into a first intermediate code, PLA2 translates control outputs 281 of the operators to a second intermediate code, and PLA3 combines both intermediate codes to generate a set of control inputs 279 for the operators. Such a cascaded arrangement may be desirable because it may require less hardware than the single PLA of FIG. 2A.

In the preferred embodiment, the connectivity of the crossbar interconnects 240, 250 and the interconnections between operators in stage 230 are not configurable dynamically based on control information in data processing instructions. Instead, these components 240, 250 are configurable in advance of operations by setting the PSCI, possibly by uploads or performance of control setting operations.

Input interconnect 240 provides operand inputs for each of the plurality of operator modules 202-208. The input interconnect 240 can receive operands 224 according to decoded data processing instructions and can receive result values from the outputs of the operators 202-204 via feedback bus 225.

Output interconnect 250 receives outputs from the operator modules 202-208 and supplies the final output result 290 of the configurable execution unit 126. By virtue of the feedback bus 225, the crossbar switch 240 and, optionally also the storage operators 206, series and parallel combinations of simple multiple operations can execute complex operations on the input operands 224 responsive to a single data processing instruction, before supplying a result 290 outside the execution unit. These advantageous types of "deep" execution operation may be regarded, in simple terms, as operations in which a plurality (generally three or more) of mathematical operations are performed sequentially on operands or a set of operands before the results 290 are sent out to be written to a result register in the register file 112. In these types of deep operations the storage operators 206 can hold intermediate results so that they can participate in later operation cycles before results 290 are output. Series and/or parallel operations of this type are novel. Moreover, the facility to build networks which are series-parallel combinations of basic operators is advantageous. An example of a parallel-type operation is a range check: AND(A>min, A<max), where the two compare calculations are done in parallel on the common operand A].

A skilled person will appreciate that the entire structure of FIG. 2 can be pipelined appropriately to enable complex multistage operations to be achieved without compromising processor speed.

Thus it has be described how, in use, the instruction fetch and decode circuit 110 decodes data processing instructions and controls the various components of the processor 100 such that the configuration information 277 from the instruction is supplied to the programmable look-up table 210 and the or each operand 224 is supplied from the register file to the input interconnect 240. In this way, the configuration information 277 from the instruction selectively, dynamically modifies aspects of the function and/or behaviour of one or more of the operators via the programmable lookup table 210.

The configurable execution unit 126 thus relies on several types of control. First, there is static control exemplified in the advantageous level of hardwiring to provide the various operator classes of modules 202-208. Second, there is pseudo static control information (PSCI), which resides for example in the predetermined configurations of the interconnect components 240, 250 and the programmable lookup table 210. As explained herein before, Pseudo static control information is distributed to certain configurable components (for example the lookup table 210 and the interconnects 240, 250) to determine aspects of the function and behaviours of execution unit 200 in advance of performing software-customised instructions which are themselves capable of dynamically configuring (adjusting configuration) of operators on an instruction by instruction basis. In addition, there is dynamic control information which can be provided by instructions on a cycle by cycle basis. The instruction set may be customised after manufacture provided it adheres to certain general protocols which ensure the instruction set remains compatible with the operation of the processor. The combination of post manufacture software-customised instructions capable of dynamically configuring operators and other components which are configurable in advance permits a wide range of manipulations and mathematical functions and leads to elegant solutions to complex algorithms. In this context elegant might be taken to mean reducing the cycle numbers and power requirements.

The PSCI may be distributed to components by means of, for example, (i) direct upload from an external DMA port or (ii) by performance of specifically designed PSCI setting instructions according to which data used to calculate PSCI settings will enter the unit as operand data 224 with results setting PSCI based on the destination address.

Dynamic control information 277 contained in the opcode part of a processor instruction (including operator configuration information) is used to access the programmable look-up table 210. In preferred embodiments, the dynamic control information is represented by a multi-bit field in the instruction and the settings issued from the programmable lookup table 210 include an expanded set of control inputs (settings) for the entire execution unit 230.

In preferred embodiments, the various modules 202-208 of the operator stage 230 are designed to handle data processing operations at least one input of which is a multi-bit value, such as a vector or an element of a vector (a scalar). Accordingly, the preferred operator modules 202-208 are configurable at the level of operations on multi-bit values. For example, a 64-bit vector input to a data processing operation may include four 16-bit scalar operands. Herein a vector may be regarded as an assembly of scalar operands. Software customisable vector arithmetic may thus be achieved on pluralities of scalar operands and typically requires a certain amount of permutation of scalar elements. Not all operands of a vector operation need be vectors; for example, a vector operation may have both scalar and vector inputs and may output a result that is either a scalar or vector.

Figure 3:
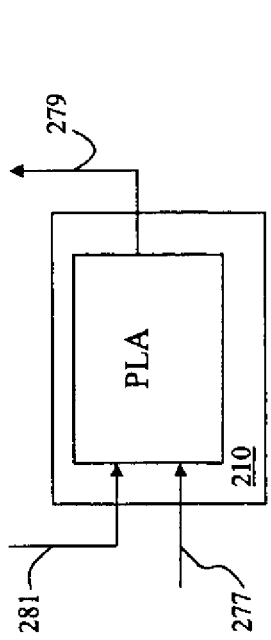
FIG. 3 Schematically illustrates exemplary instruction formats suitable for use with the computer system of FIG. 1.

Various instruction formats suitable for use with embodiments of the present invention are shown in FIG. 3. At 300 there is a PSCI setting instruction specifically designed to perform pseudo static control setting operations for example for one or more of the components 210, 240 and/or 250. The PSCI setting instruction 300 includes a first opcode portion 302 indicating it is a type of PSCI setting instruction, and a second opcode portion 303 indicating a destination associated with the or each component 210, 240, 250 intended to be configured. The remainder of the instruction 304 may be used to carry or point to PSCI intended for the destination.

Referring to the instruction format 400 there is disclosed a class of data processing instructions including dynamic configuration setting information, based on which a reference is made in the programmable look-up table 210. The instruction 400 includes a first opcode portion 410 defining the data processing operation to be performed, preferably including an indication that the instruction is a type of data processing operation including dynamic configuration setting information for configuring one or more operators of the configurable execution unit 230. The instruction 400 also includes a second opcode portion 415 pointing to a destination address to which the results will be sent, a third opcode portion 420 containing operator configuration information 420, and one or more operands 430 for use in the data processing operation. Alternatively, the field 430 may include pointers to one or more operands in registers. A skilled person will appreciate that one or more of the fields described may be combined or omitted in other embodiments.

The operator configuration information 420 is used to access the look-up table 210 and is translated to contribute to operator control input settings 279, as described hereinbefore.

Preferred embodiments can handle different types of data processing calculations within certain algorithms particularly efficiently, for example algorithms including convolutions, Fast Fourier Transforms, Trellis/Viterbi calculations, correlations, finite impulse response filtering, and the like. Moreover, preferred processors support the performance of software-customised instructions which operate on multi-bit operand values, for example instructions acting on operands of four or more bits or at the level of computer words (typically 16, 32, or 64 bits). Embodiments can thus efficiently perform complex software-customised operations as sets of customised operations (series and/or parallel), in response to individual software-customised processor instructions forming part of the processor instruction set.

A skilled reader will appreciate that, while the foregoing has described what is considered to be the best mode and where appropriate other modes of performing the invention, the invention should not be limited to specific apparatus configurations or method steps disclosed in this description of the preferred embodiment. Those skilled in the art will also recognize that the invention has a broad range of applications, and that the embodiments admit of a wide range of modifications without departing from the inventive concepts.

For example, any aspect of the operator module or modules may be dynamically configurable. The programmable lookup table may be any device suitable for translation of opcode information to operator control settings. It is possible, in other embodiments, one or more of the components 240, 250 may be configured dynamically by means of control information in an instruction or that certain operators are configurable in advance by directly uploading PSCI.

I claim:

1. A computer processor comprising:
   an instruction memory comprising instructions making up an instruction set for the processor, wherein the instruction set includes data processing instructions, each data processing instruction comprising an opcode portion carrying dynamic configuration information and operand data portion;
   a decode unit comprising control circuitry configured to receive and decode a sequence of instructions supplied from the instruction memory, including said data processing instructions, and control the components of the processor in accordance with each of the decoded instructions;
   a configurable execution unit comprising operators capable of being dynamically configured at the level of processing multi-bit operand values, on an instruction by instruction basis, responsive to the configuration information carried in the opcode portion of each data-processing instruction, wherein said operators are provided in one or more dynamically configurable operator modules, said operators being configured to separately receive (i) at least one input operand responsive to the operand data in said data processing instruction and (ii) operator configuration settings defining aspects of the function and/or behavior of said configurable operator module at the level of processing multi-bit operands, wherein said operator configuration settings are derived from the dynamic configuration information carried in the opcode portion of said data processing instruction and wherein said execution unit comprises a configurable switching fabric having connectivity defined at least in part by pseudo static control information provided independently of the instruction carrying the dynamic configuration information and; and
   a programmable look up table that comprises said pseudo static control information and configured to receive said dynamic configuration information from the opcode portion of respective data processing instructions and being adapted translate said dynamic configuration information into operator configuration settings applying to said configurable operators.

2. The computer processor of claim 1, wherein said programmable lookup table comprises a programmable logic array.

3. The computer processor of claim 2, wherein said programmable lookup table comprises cascaded programmable logic arrays.

4. The computer processor of claim 1, wherein said configurable switching fabric comprises one or more of: a configurable input interconnect means connected upstream of the configurable operators and a configurable output interconnect means connected downstream of the configurable operators.

5. The computer processor of claim 4, wherein said configurable switching fabric comprises configurable input interconnect means connected upstream of the configurable operators and configurable output interconnect means connected downstream of said configurable operators.

6. The computer processor of claim 5, wherein one or more outputs of one or more configurable operator modules is connected to said configurable input interconnect means.

7. The computer processor of claim 1, wherein at least one configurable operator module is hard-wired to support a predetermined class of operation and is dynamically configurable by operator configuration settings to adjust operator function and/or behaviour within said general operation class.

8. The computer processor of claim 1, wherein said operators comprise a module with configurable shift and/or permute functionality.

9. The computer processor of claim 1, wherein said pseudo static control information is provided independently of the instruction carrying the dynamic configuration information.

10. The computer processor of claim 9, wherein one or more components include thereon pseudo static control information established by configuration setting instructions.

11. The computer processor of claim 1, comprising a plurality of dynamically configurable operators configurable by means of configuration information provided in a data processing instruction, wherein, in use, an operator configuration according to said configuration information acts on operands indicated in said data processing operation.

12. The computer processor of claim 1, comprising one or more dynamically configurable operators configurable by means of configuration information provided in a data processing instruction, wherein, in use, an operator configuration according to said configuration information acts on operands indicated in a subsequent instruction.

13. The computer processor of claim 1, capable in response to a single instruction of performing two or more sequential, selectively configurable operations on an operand before outputting results.

14. The computer processor of claim 1, wherein one or more of said configurable operator modules supports SIMD operations.

15. The computer processor of claim 1, comprising operators in one or more of the following operator classes: multiplier, arithmetic logic, storage, shift and/or permute.

16. The computer processor of claim 1, wherein the programmable lookup table generates operator configuration settings selected from one or more of: a carry-in signal; a multiplexer selection; a negotiable input; an overflow setting; and other suitable inputs of operators.

17. The computer processor of claim 1, wherein the programmable lookup table receives one or more inputs from one or more dynamically configurable operator modules.

18. The computer processor of claim 17, wherein the input from the dynamically configurable operator module comprises one or more selected from: an overflow indication; a FIFO full signal; a Boolean result of arithmetic comparison; and other suitable outputs of operators.

19. The computer processor of claim 1, wherein the programmable lookup table comprises different pseudo static control information.

20. A computer processor method for use comprising:
    storing instructions in an instruction memory that make up an instruction set for the processor, wherein the instruction set includes data processing instructions, each data processing instruction comprising an opcode portion carrying dynamic configuration information and operand data portion;

receiving and decoding in a decode unit having control circuitry a sequence of instructions supplied from the instruction memory, including said data processing instructions, controlling the components of the processor in accordance with each of the decoded instructions;

dynamically configuring a configurable execution unit with operators configured at the level of processing multi-bit operand values, on an instruction by instruction basis, responsive to the configuration information carried in the opcode portion of each data-processing instruction, wherein said operators are provided in one or more dynamically configurable operator modules, said operators being configured to separately receive (i) at least one input operand responsive to the operand data in said data processing instruction and (ii) operator configuration settings defining aspects of the function and/or behaviour of said configurable operator module at the level of processing multi-bit operands, wherein said operator configuration settings are derived from the dynamic configuration information carried in the opcode portion of said data processing instruction and wherein said execution unit connects through configurable switching fabric defined at least in part by pseudo static control information provided independently of the instruction carrying the dynamic configuration information;

receiving in a programmable look up the table said dynamic configuration information from the opcode portion of respective data processing instructions;

translating in the programmable look up table said dynamic configuration information into operator configuration settings applying to said configurable operators, wherein the programmable look up table comprises the pseudo static control information.

21. The method according to claim 20, wherein a sequence of two or more operations are performed in series responsive to the instruction.

22. The method according to claim 20, wherein two or more operations are performed in parallel responsive to the instruction.

23. The method according to claim 20, wherein a combination of series and parallel operations is performed responsive to the instruction.

24. The method according to claim 20, wherein a plurality of series and/or parallel operations are performed responsive to the instruction and at least one intermediate result is held in a storage operator between operations or before being * output from the configurable execution unit to a result store.

25. The method according to claim 20, wherein a—plurality of series and/or parallel operations are performed responsive to the instruction and wherein an intermediate result is shifted or permuted between operations or before being output from the configurable execution unit to a result store.

* * * * *